Patented Apr. 11, 1939

2,154,362

UNITED STATES PATENT OFFICE 2,154,362

CASEIN PAINT COMPOSITION

Herman A. Scholz, Oak Park, Ill., assignor to United States Gypsum Company, Chicago, Ill., a corporation of Illinois No Drawing. Application February 4, 1935, Serial No. 4,877

12 Claims. (Cl. 134—46)

The present invention relates to an improved casein paint composition that is prepared in paste form so that it may be used as such or diluted with water to proper spreading consistency.

One of the objects of the present invention is to prepare a paint from casein and various solvents, stabilizers, pigments and fillers which will retain its original consistency and quality unimpaired over long periods of time without deterioration, livering, settling or hydrolysis of the casein.

A further object of the invention is to prepare a casein paste or solution from casein, a solvent therefor, and a stabilizing agent comprising alkali salts of amphoteric metals.

A further object of the invention relates to the method employed from the compounding of a casein paste paint composition in which the sequence of operations is particularly designed to yield the best results with the least expenditure of time and energy.

Still a further object of the invention is to prepare a paste paint from casein, water, and alkaline solvents which is resistant to changes in consistency resulting from hydrolysis of the casein or other causes, and which casein paint is stabilized by the addition thereto of certain alkali salts of metals that are capable of acting as nonmetals so as to form salts with the alkali metals such as sodium, potassium, and their equivalents.

Other objects of the invention will be apparent from the hereunto appended claims and the detailed description of the processes and products hereinbelow.

Paste paints made from casein and its equivalent proteid substances have already been known for some years, and their methods of manufacture have become more or less standardized. However, it has been found that such casein paints are lacking in stability and keeping qualities, despite the fact that various preservatives have been added in an effort to prevent deterioration. It appears that the main difficulty with such paints is that they tend to become thinner with age, finally becoming so liquid that the pigments and fillers suspended therein separate from the casein vehicle and settle to the bottom of the containers. Contrary to ordinary oil paints, however, such deteriorated paints cannot be brought back to their original condition by stirring and mixing, because of the fact that the casein vehicle—that is, the casein solution—has lost its viscosity and hence is no longer able to retain the pigments and fillers in suspension. This loss in viscosity appears to be caused by a progressive hydrolysis of the casein by the action of the alkalin material employed for its solution. The action is a sort of hydrolysis of the large casein molecule or complex and is irreversible.

One of the primary objects of the present invention is, therefore, to overcome the tendency of casein paste paints to deteriorate by reason of such hydrolysis, and this is accomplished mainly by the use, together with the usual alkaline solvents, of a stabilizing agent which prevents the hydrolysis and, hence, the resultant loss in viscosity. It has been found by the inventor that alkali salts of amphoteric metals, such as sodium or potassium stannate, aluminate, antimonate or vanadate, and their equivalents, will serve as stablizing agents for alkaline casein solutions, such, for example, as result from the solution of casein in an aqueous solution of borax or similar alkaline salt.

A further advantage of a paint made in accordance with the present invention resides in the fact that it has better gel characteristics, better flowability and enhanced brushing properties, and when dry is more resistant to wetting and washing.

In general, it may be stated that the casein paints made in accordance with the present invention consist of a vehicle and relatively inert mineral matter in the form of fillers and pigments. By the term "pigments" the inventor intends to cover colored as well as white pigments and also any mineral products used merely as fillers. The vehicle consists of a stabilized solution of casein in an alkali, such as borax, to which there has been added an alkali salt of an amphoteric metal. The pigments may be of any kind, such as zinc white, zinc sulfide pigments, mica, talc, clay, iron oxides, cadmium sulfide, chromium oxides, ultramarine, lead chromate, and the like. Even carbon and shale blacks as well as organic pigments of many types, such as toners and lakes, may be employed, depending upon the color desired in the paint. The paint is manufactured and sold in the form of a rather heavy paste somewhat resembling in consistency the paste white-lead familiar to the oil-paint trade. In actual use this paste is diluted with from one-half to equal parts of water, whereby a readily spreadable or sprayable composition results. The various formulas given hereinbelow are intended to be purely illustrative and are not to be construed as limitations upon the invention.

In addition to the casein vehicle and fillers, there are also used in these paste paints certain organic substances, such as oils and essential oils. These are for the purpose of waterproofing, and they also act as preservatives, plasticizers, and mold preventatives. The oils used may be linseed oil, tung oil, Perilla oil, fish oil, and the like, or even a deodorized mineral oil; and the essential oil may be a terpene such as pine oil, terpineol and similar substances. The oils, such as the linseed oil, etc., should preferably be of a type, now procurable on the market, that exhibits only a slight tendency toward yellowing on exposure to the air in the absence of light.

A number of different procedural methods may be employed in compounding the paint. Thus, for example, a casein solution containing the stabilizer may first be prepared. To this casein solution the various pigments, fillers, and tinting agents may be added, following which the mixture may be ground in a paint mill much in the same manner that oil paints are ground. The purpose of the grinding is to secure as smooth and uniform a mixture as possible.

An alternative method is to prepare a solution of casein containing the stabilizer and then to mix this solution with such of the pigments as may exhibit a slight tendency to react with the casein (as, for instance, lithopone or zinc sulfide and the like), following which the mixture is heated to allow any reaction between the pigment and the casein solution to complete itself. The remainder of the pigments and tinting agents may then be added and the mixture ground as mentioned above.

A further alternative yielding excellent results is to prepare a dry finely powdered mixture of all of the ingredients of the paint, with the exception of the oils and essential oils. This can be done, for example, by grinding casein, or merely mixing the casein, with the dry fillers, pigments, and tinting agents, as well as the dry solvents and stabilizers. The uniform mixture of materials thus obtained is then gradually stirred into a predetermined amount of water, and the mixture is then cooked or heated until a smooth paste results. During this stage of the manufacture the oils and essential oils may be added, or they may be emulsified with a small amount of a separately prepared casein solution and then worked into the paste paint while it is being heated or cooked, the agitation being continued until a smooth, homogeneous paste results. By thus operating, the grinding operation in the paint mill may be dispensed with.

As examples of the present invention, the following may be cited:

First method

*Preparation of casein solution.*—82.5 pounds of commercial casein are mixed with about 32 gallons of water and thoroughly stirred for a sufficient time until a smooth mixture of thoroughly soaked casein results. About 5 pounds and 2 ounces of sodium stannate are dissolved in about 5 gallons of water, while in a separate container about 15 pounds of borax are likewise dissolved in about 3½ gallons of hot water. The sodium stannate solution is then added to the casein mixture with constant agitation, and as soon as all of it has been added the borax solution is run into the mixture. An additional amount of, say, 4½ gallons of water may then be added and the mixing continued while heating the mixture gradually to about 150° to 160° F. The mixing is continued at the stated temperature until a smooth solution results. Using the proportions above given, the solution will be found to exhibit an alkalinity equivalent to from about pH 8.0 to about pH 9.0. The ratio of casein to sodium stannate in the above formula is substantially 100:6.2. The sodium stannate used has the formula $Na_2SnO_3 \cdot 3H_2O$. It may replaced by stoichiometrically equivalent amounts of sodium or potassium antimonate, vanadate or eluminate with substantially equivalent results. These alkali salts of the amphoteric metals, such as tin, antimony, vanadium, or aluminum, have the property, as discovered by the inventor, of preventing the hydrolysis of the casein. Corresponding ammonium salts may also be used.

*Mixing the paint.*—The casein solution thus prepared forms the basis for the paint itself. The latter is made by taking the casein solution and mixing therewith pigments such as lithopone, finely ground mica, talc, etc., and an oil such as pine oil and, if desired, a plasticizer such as linseed oil, etc., and also, if desired, a small amount of ethyl alcohol. The latter is for the purpose of somewhat lowering the consistency of the mixture. The pigments, etc. are mixed with the casein solution gradually, and when all has been incorporated the mixture is ground in a paint mill until uniformly smooth.

The percentage composition of the solids of the casein paint made in accordance with the present invention is about as follows:

| | Per cent |
|---|---|
| Casein | 10.0 |
| Amphoteric metal salt | 0.6 |
| Borax or equivalent | 1.8 |
| Pigments and fillers | 80.0 |
| Mica or equivalent | 5.0 |

Oils, q. s. to make 100 parts.

To this there may be added about 30 parts of water to form the paste.

As further exempletive of the modifications in the composition of the solids of the paste casein paint may be mentioned the following formulas:

A

| | Parts |
|---|---|
| Casein | 120 |
| Sodium stannate | 3 |
| Borax | 20 |
| Pigments and fillers | 850 |
| Pine oil | 10 |

B

| | Parts |
|---|---|
| Casein | 120 |
| Sodium stannate | 10 |
| Borax | 20 |
| Pigments and fillers | 850 |
| Pine oil | 10 |

Among the pigments may be mentioned titanium oxide, "Titanox," zinc sulfide pigments, cadmium lithopone, barium sulfate, clay, mica, talc, etc.

Second method

A casein solution may be prepared as given in the first method. To this may be added the required amount of zinc pigments, and the mixture may be heated to, say, 150° to 170° F. until any reaction that might tend to occur has had time to complete itself. The mixture or suspension thus obtained is then employed as is the casein solution of the first method, taking into consideration the fact that some of the pigment has thus already been incorporated with the paint composition. The remainder of the fillers, pigments and tinting agents, as well as the oils or essential oils, is then mixed as in the first method, whereafter the mixture is ground smooth in a paint mill.

Third method

This, as already briefly mentioned, consists in preparing a dry mixture of the ingredients and stirring this into the required amount of water and heating and stirring the mixture until smooth. For instance, a mixture containing the various ingredients as set forth in the above percentage formula may be used, stirring the same gradually into about 30 to 35 parts of water and heating the mixture to from 150° to 170° F. with constant agitation until a smooth uniform mixture results. The oils or essential oils, or both, in the above formula are added after the solution of the casein during the heating stages or subsequently.

Irrespective as to how the mixture is made, the final paste paint composition is then directly filled into the containers in which it is to be sold, such as cans, tubs, or the like.

To sum up, the invention is mainly predicated upon the use of a solution of casein stabilized against deterioration by the addition thereto of an alkali salt of an amphoteric metal and the particular method of compounding the ingredients, all as set forth in the following claims.

In the hereunto appended claims, the term "mild alkali solvent" is used to designate those alkaline-reacting alkali metal and ammonium salts that do not have an hydroxyl-ion concentration equal to that of the hydroxides of the alkali metals, such as sodium or potassium hydroxide.

I claim:

1. A stable aqueous casein paste paint whose viscosity and pigment-suspending properties remain substantially unimpaired for a long time comprising water, casein, sufficient mild alkali solvent to solubilize the same, and, as a stabilizing agent, an alkali salt of the amphoteric metals constituting the group consisting of aluminum, antimony, tin and vanadium, said salt being present in an amount not exceeding that of the solvent.

2. A stable aqueous casein paste paint whose viscosity and pigment-suspending properties remain substantially unimpaired for a long time comprising in addition to its water content the following ingredients in or about the proportions mentioned:

|  | Per cent |
|---|---|
| Casein | 10.0 |
| Alkali salt of an amphoteric metal from the group consisting of aluminum, antimony, tin and vanadium | 0.6 |
| A soluble borate | 1.8 |
| Pigments and fillers | 85.0 |
| Oils | 2.6 |

3. A stable aqueous casein paste paint whose viscosity and pigment-suspending properties remain substantially unimpaired for a long time comprising the following ingredients in or about the quantities mentioned:

|  | Parts |
|---|---|
| Casein | 120 |
| Sodium stannate | 3–10 |
| Borax | 20 |
| Pigments and fillers | 850 |
| Pine oil | 10 |

4. The process of preserving for a long time the viscosity and pigment-suspending properties of a mildly alkaline-reacting aqueous solution of casein in a mild alkali solvent which comprises adding thereto an amount of an alkali salt of an amphoteric metal from the group consisting of aluminum, antimony, tin and vanadium not exceeding that of the said solvent.

5. A stable casein paste paint whose viscosity and pigment-suspending properties remain substantially unimpaired for a long time comprising a pigment, water, casein, borax sufficient to dissolve the casein, and, as a stabilizing agent, sodium stannate not to exceed one-half the amount of the borax.

6. A stable aqueous casein paste paint whose viscosity and pigment-suspending properties remain substantially unimpaired for a long time comprising water, casein, sufficient borax to solubilize the same and, as a stabilizing agent, an alkali salt of the amphoteric metals constituting the group consisting of aluminum, antimony, tin and vanadium, said salt being present in an amount not exceeding that of the borax.

7. The process of preserving for a long time the viscosity and pigment-suspending properties of an aqueous solution of casein in borax which comprises adding thereto an amount of an alkali salt of an amphoteric metal from the group consisting of aluminum, antimony, tin and vanadium not exceeding that of the borax.

8. The method of preparing a casein paint in the paste form characterized by its stability and substantially uniform viscosity over long periods of time, which comprises dissolving casein in an aqueous solution of an alkaline-reacting alkali salt and of a stabilizing agent consisting of an alkali metal salt of the amphoteric hydroxides of the metals from the group consisting of aluminum, antimony, tin and vanadium, adding to the solution a pigment reactive with respect to casein, and maintaining the resulting mixture at an elevated temperature to permit the pigment to react with the casein solution.

9. A casein paint in paste form comprising water, casein, a sufficient amount of an alkaline-reacting alkali salt to solubilize the same, and, as a stabilizing agent, an alkali metal salt of the amphoteric hydroxides of the metals from the group consisting of aluminum, antimony, tin and vanadium, and a pigment.

10. A casein paint in paste form characterized by its stability and substantially uniform viscosity over long periods of time, which comprises the heat-reaction product of water, casein, a pigment reactive with respect to casein, a sufficient quantity of an alkaline-reacting casein solvent, and, as a stabilizer, an alkali metal salt of the amphoteric hydroxides of the metals from the group consisting of aluminum, antimony, tin and vanadium.

11. A casein solution suitable for the production of a casein paste paint comprising water, casein, a sufficient amount of an alkaline-reacting alkali salt to solubilize the same, and, as a stabilizing agent, an alkali metal salt of the amphoteric hydroxides of the metals from the group consisting of aluminum, antimony, tin and vanadium.

12. An alkaline-reacting casein solution stabilized against hydrolysis by the presence therein of a stabilizing reagent selected from the group consisting of the alkali metal salts of the amphoteric hydroxides of the metals aluminum, antimony, tin and vanadium.

HERMAN A. SCHOLZ.